United States Patent [19]
Serita et al.

[11] Patent Number: 5,617,161
[45] Date of Patent: Apr. 1, 1997

[54] CAMERA PROVIDED WITH A MAGNETIC RECORDING DEVICE

[75] Inventors: Yasuaki Serita, Sakai; Kenji Tsuji, Kashiwara; Hiroyuki Okada, Sakai, all of Japan

[73] Assignee: Minolta Co., Ltd., Osaka, Japan

[21] Appl. No.: 463,640

[22] Filed: Jun. 6, 1995

[30] Foreign Application Priority Data

Jun. 8, 1994 [JP] Japan .................................. 6-126491

[51] Int. Cl.⁶ .................................................. G03B 17/24
[52] U.S. Cl. .................................................. 396/319
[58] Field of Search .............................. 354/106, 75, 76, 354/105

[56] References Cited

U.S. PATENT DOCUMENTS 5,155,513  10/1992  Matsumura et al. .
5,382,993  1/1995  Hozumi et al. .
5,471,267  11/1995  Goto et al. .
5,475,455  12/1995  Hibino et al. .
5,477,289  12/1995  Smart .

FOREIGN PATENT DOCUMENTS 2-127632  6/1994  Japan .

*Primary Examiner*—David M. Gray
*Attorney, Agent, or Firm*—Burns, Doane, Swecker & Mathis, LLP

[57] ABSTRACT

A camera includes: a data generating device which generates a plurality of kinds of data; a data designating device which designates a kind of data to be recorded among the plurality of kinds of data; a record data setting device which sets the kind of data designated by the data designating device as record data when the data designating device designates it, and sets a predetermined kind of data as record data when the data designating device designates no kinds of data; and a recording device which records the set record data on a film mounted on the camera.

13 Claims, 16 Drawing Sheets

CAMERA PROVIDED WITH A MAGNETIC RECORDING DEVICE

BACKGROUND OF THE INVENTION

This invention relates to a camera provided with a magnetic recording device for recording specified data in a magnetic recording portion formed on a photographic film.

Generally, in such cameras, data concerning photographing information, etc. is recorded in a recording position determined for each frame. The recorded data is read during the printing operation at a photolaboratory. The read data is used as reference data in making prints or is printed on the front or rear surface of a printed sheet.

A plurality of kinds of data can be thought as those to be recorded. However, because of a limited storage capacity of the magnetic recording portion of the film, the amount of data to be recorded for each frame is also limited. Accordingly, it is difficult to record all kinds of data in the recording portion. On the other hand, the kinds of data a user desires to record differs largely depending upon the user. Accordingly, if only specified kinds of data can always be recorded, the camera cannot sufficiently respond to the user's desire. In order to solve this problem, the camera may be provided with an external designator with which the user can designate his desired kinds of data, and only the kinds of data designated by the user by means of this designator may be magnetically recorded.

With such a camera, if the user takes no trouble to designate the data, no data is recorded on the film, with the result that the data recording function cannot be fully utilized. In this case, also, if the partially exposed film is reused after being rewound, the already exposed frames may be erroneously detected to be unexposed frames because no data are written for these frames, and double exposure will occur from the first one of the erroneously detected frames.

SUMMARY OF THE INVENTION

It is an object of the present invention to provide a camera provided with a magnetic recording device which has overcome the problems residing in the prior art.

It is another object of the present invention to provide a camera provided with a magnetic recording device which can fully utilize its data recording function regardless of whether or not the user designates data to be recorded.

The present invention is directed to a camera comprising: a data generating device which generates a plurality of kinds of data; a data designating device which designates a kind of data to be recorded among the plurality of kinds of data; a record data setting device which sets the kind of data designated by the data designating device as record data when the data designating device designates it, and sets a predetermined kind of data as record data when the data designating device designates no kinds of data; and a recording device which records the set record data on a film mounted on the camera.

The recording device may include a magnetic recorder for recording the set record data on the film magnetically. Also, the magnetic recorder may execute the recording when the film is being fed.

There may be provided a controller which controls the magnetic recorder to record the set record data on the film only when the film is fed at a normal speed. Also, the controller may control the data designating device and the magnetic recorder to forcibly designate and record data not relating to photographing when the film is fed at a speed other than a normal speed.

It may be appreciated that the plurality of kinds of data includes common data which is to be designated at all times and is to be included in the predetermined kind of data. The common data may be data necessary for print. Also, it may be appreciated that the plurality of kinds of data includes data which can be arbitrarily made by the user.

Also, the present invention is directed to a camera comprising: a first data generating device which generates a kind of primary data; a second data generating device which generates a plurality of kinds of additional data different from the primary data; a data designating device which designates a kind of additional data to be recorded among the plurality of kinds of additional data; a record data setting device which sets record data including the primary data and the additional data designated by the data designating device when the data designating device designates it, and sets record data including the primary data and a predetermined additional data when the data designating device designates no kinds of additional data; and a recording device which records the set record data on a film mounted on the camera.

In these cameras, a plurality of kinds of recordable data are generated and a kind of data can be desirably designated among the plurality of kinds of data by the data designating device. When no kinds of data are designated by means of the data designating device, also, a predetermined kind of data is set as record data. Accordingly, the kind of data suitable conforming to the user's desire can be recorded in accordance with the data designation performed by the user. Even if no kinds of data are designated, the data recording function can be fully utilized by recording the predetermined kind of data on the film. This will be effectively used for judgment of exposed frames.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 2:
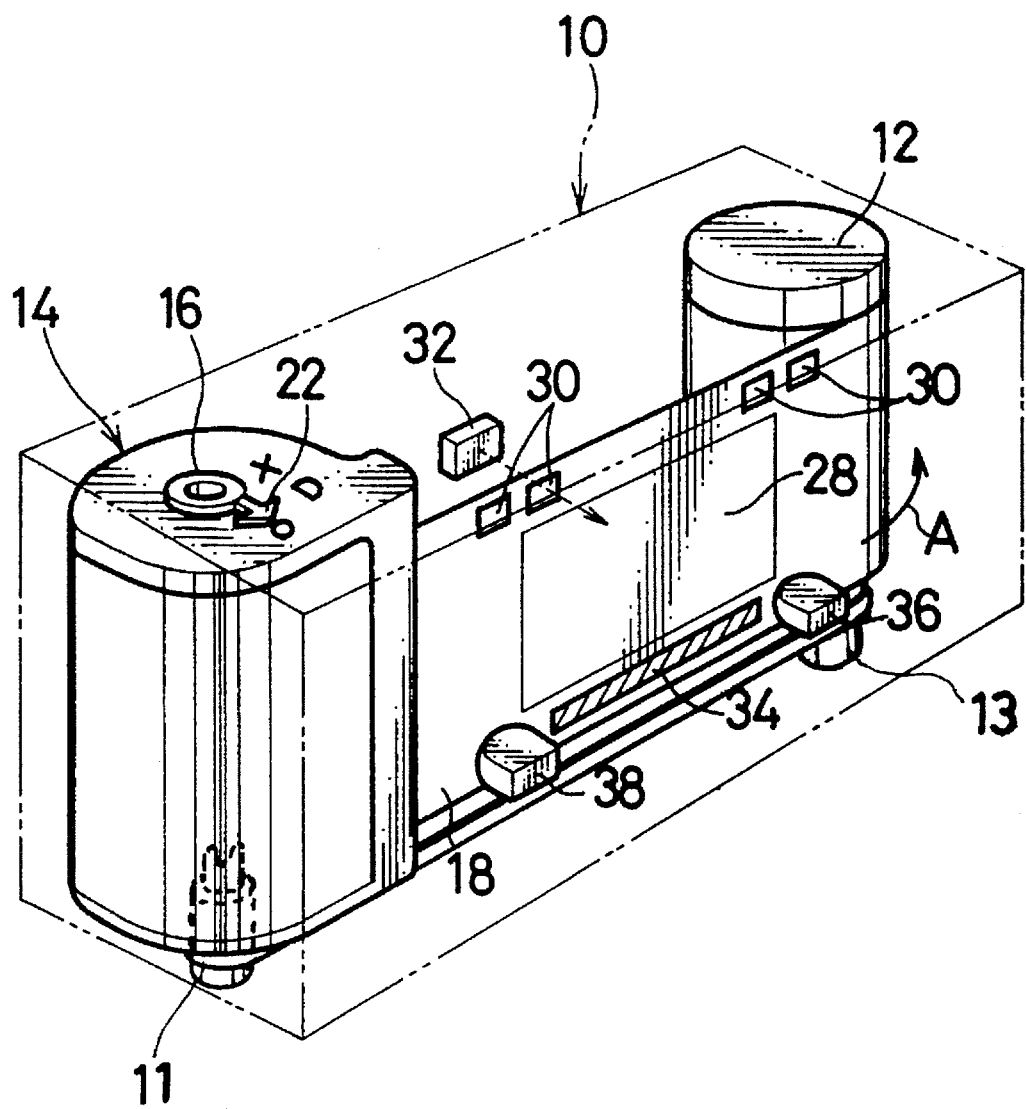
FIG. 2 is a schematic perspective view showing an internal construction of the camera.

One embodiment of the present invention will be described with the accompanying drawings. Referring now to FIG. 2, an outline of a camera 10 provided with a magnetic recording device is schematically represented by phantom lines. The camera 10 includes a rewinding claw 11 at its one end and a take-up spool 12 at its other end. A film cartridge 14 is detachably loaded on the rewinding claw 11.

Figure 3:
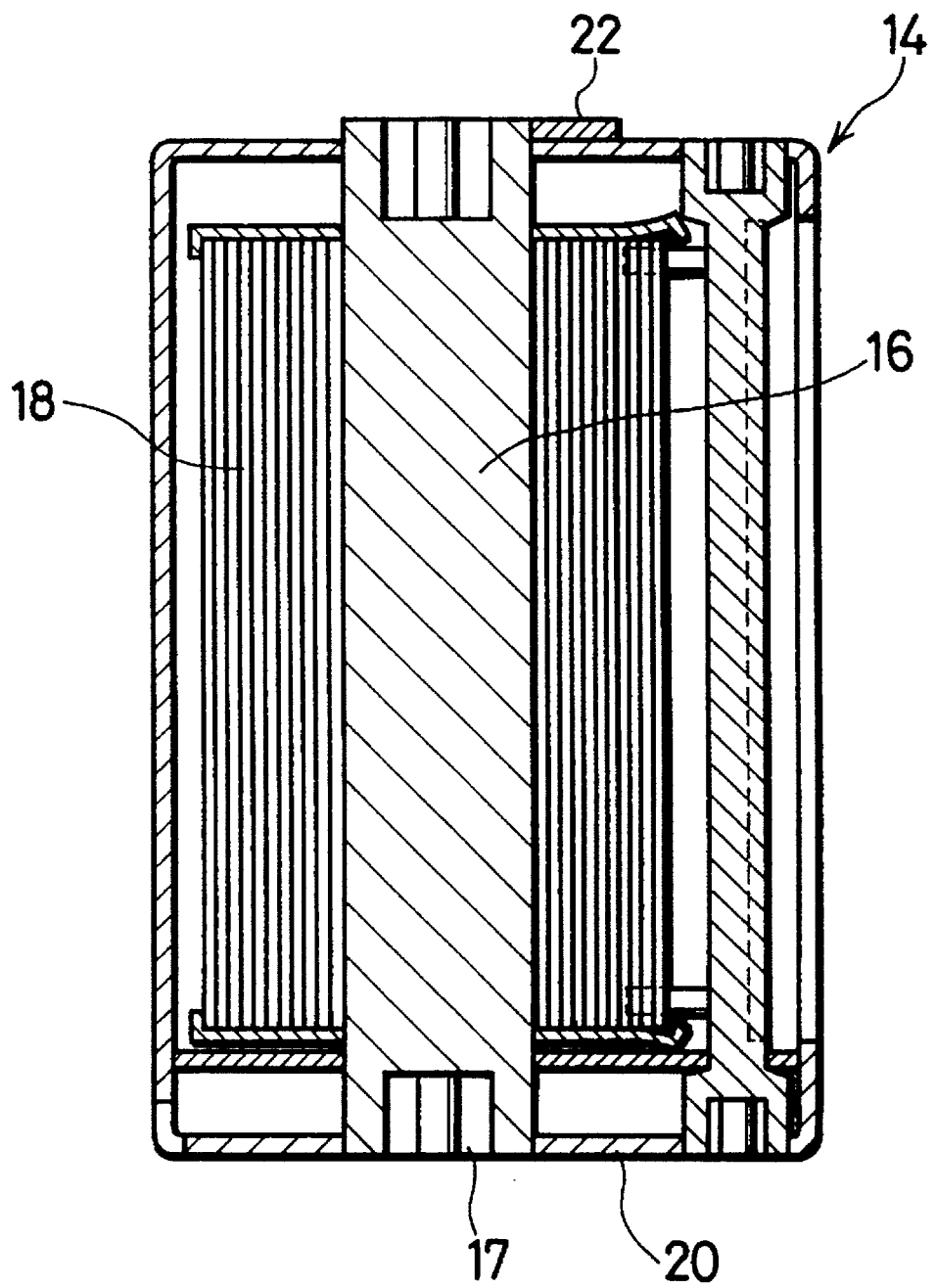
FIG. 3 is a front view in section of a film cartridge loaded in the camera.

As shown in FIG. 3, the film cartridge 14 carries a film 18 wound around a sleeve 16. The rewinding claw 11 and the take-up spool 12 are connected with a motor 13 via a drive transmission mechanism. The film 18 is withdrawn from the film cartridge 14, and then wound around the take-up spool 12 by rotating the motor 13 in the forward direction. A lower end 17 of the sleeve 16 is engaged with a fork-shaped portion of the rewinding claw 11. The film 18 is rewound from the take-up spool 12 to the film cartridge 14 by rotating the motor 13 in the reverse direction.

A disk 20 is fixed on the lower end of the sleeve 16. On the surface of the disk 20, there is provided a bar-code including black and white sections alternately arranged in the circumferential direction a shown in FIGS. 4A to 4C. This bar-code represents film information including, for example, the type of the film (negative, positive, black-and-white, etc.), ISO sensitivity, and the number of frames. On the other hand, at two positions P1 and P2 of the camera 10 juxtaposed in the circumferential direction of the disk 20, there are disposed photodetectors 15, 17 for judging whether the portions of the bar-code corresponding to the positions P1 and P2 are white or black.

Figure 4A:
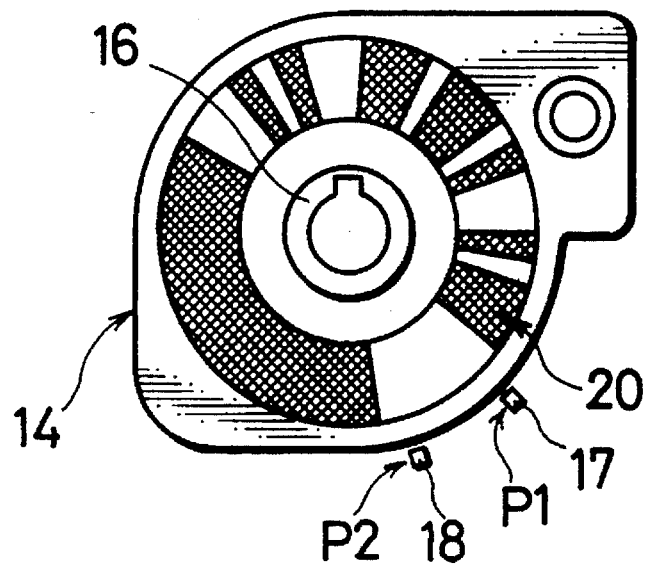
FIGS. 4A to 4C are diagrams showing a disk provided at the bottom of the film cartridge when it is in its unexposed position, partially exposed position and exposed position, respectively.
Figure 4B:
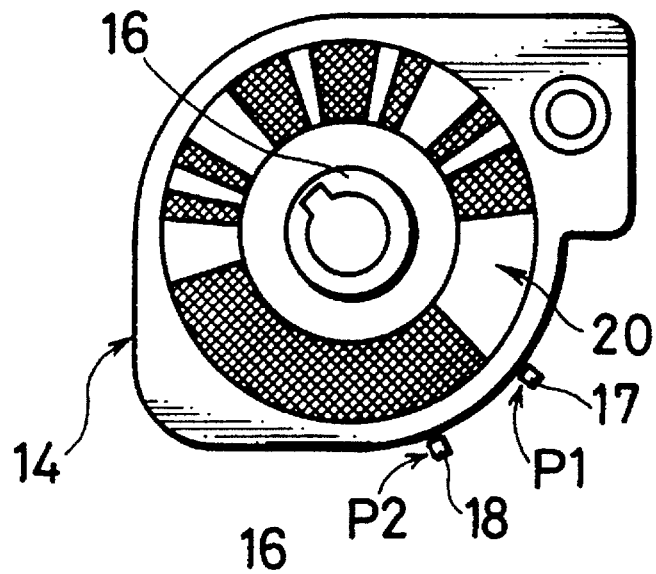
Figure 4C:
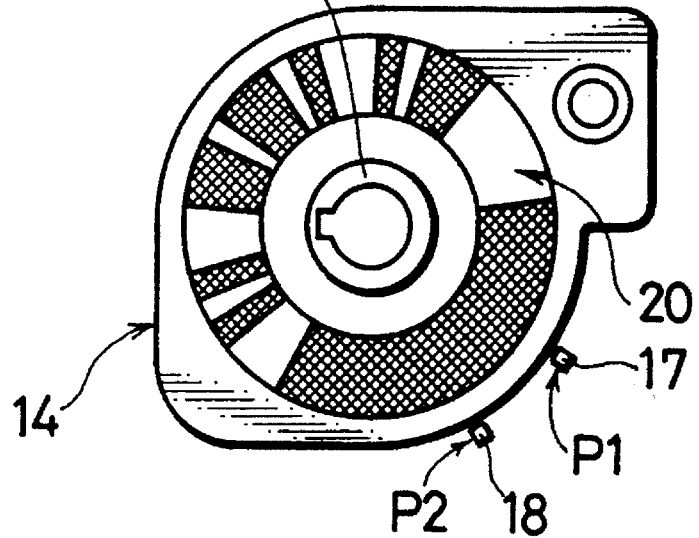
Figure 5A:
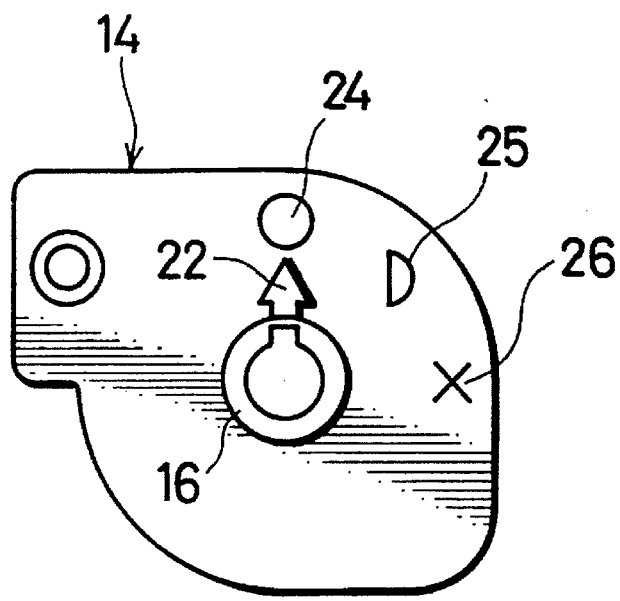
FIGS. 5A to 5C are diagrams showing a pointer provided at the top of the film cartridge when it points to a non-exposure mark, a partial exposure mark, and an exposure mark, respectively.
Figure 5B:
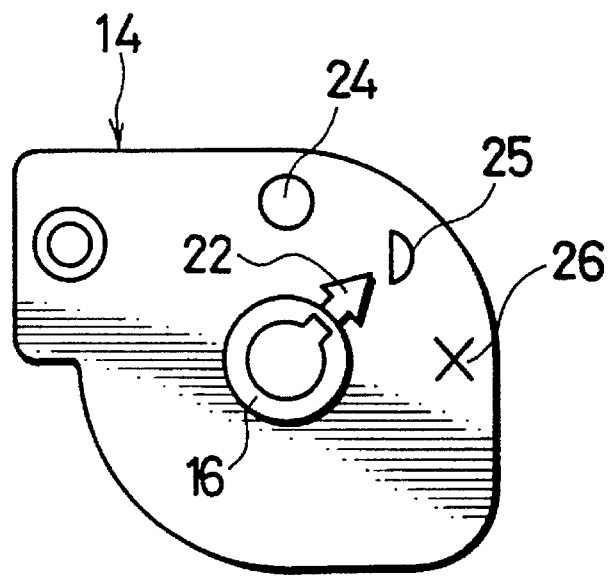
Figure 5C:
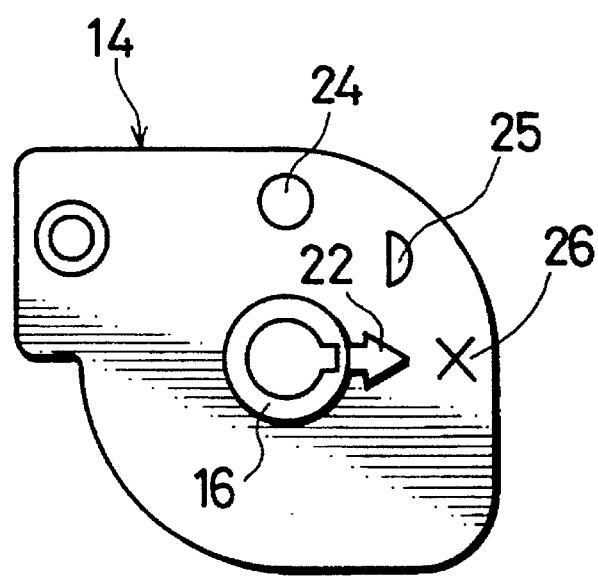

An arrow-shaped pointer 22 as shown in FIGS. 5A–5C is fixed on the upper end of the sleeve 16. On the upper surface of the film cartridge 14, there are arranged around the pointer 22 a non-exposure mark 24 indicating that the film 18 is unexposed, a partial exposure mark 25 indicating that the film 18 is partially exposed, and an exposure mark 26 indicating that the film 18 is already exposed. The phase of the pointer 22 in the circumferential direction with respect to the disk 20 is set such that the pointer 22 points to the respective marks 24 to 26 in the following situations. When the white section is detected by the photodetectors 15 and 17 at both of the positions P1 and P2 as shown in FIG. 4A, the pointer 22 points to the non-exposure mark 24. When the white section is detected by the photodetector 17 at the position P1 and the black section is detected by the photodetector 18 at the position P2 as shown in FIG. 4B, the pointer 22 points to the partial exposure mark 25. When the black section is detected by the photodetectors 15 and 17 at both of the positions P1 and P2 as shown in FIG. 4C, the pointer 22 points to the exposure mark 26.

Figure 6:
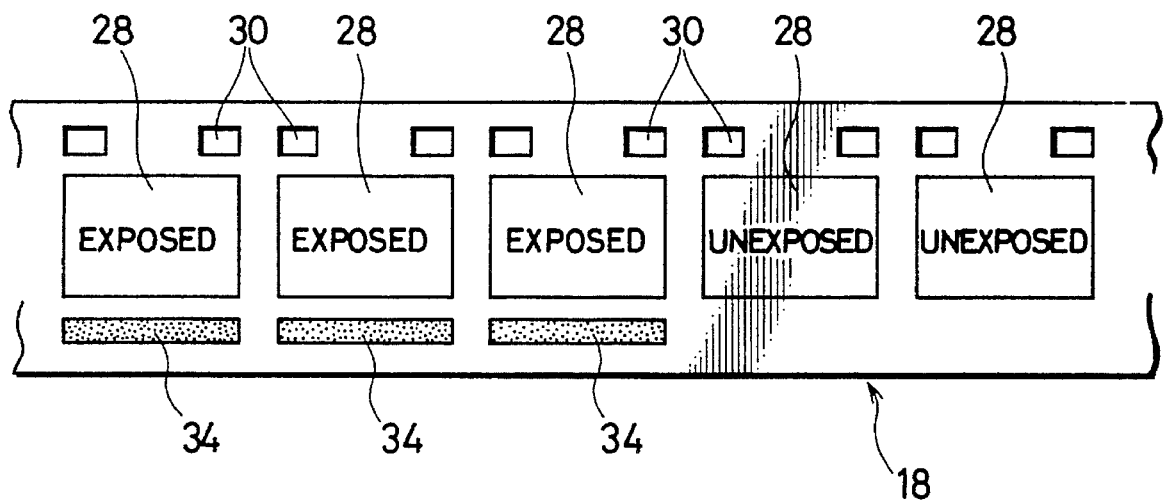
FIG. 6 is a front view of a part of the film withdrawn from the film cartridge.
Figure 7:
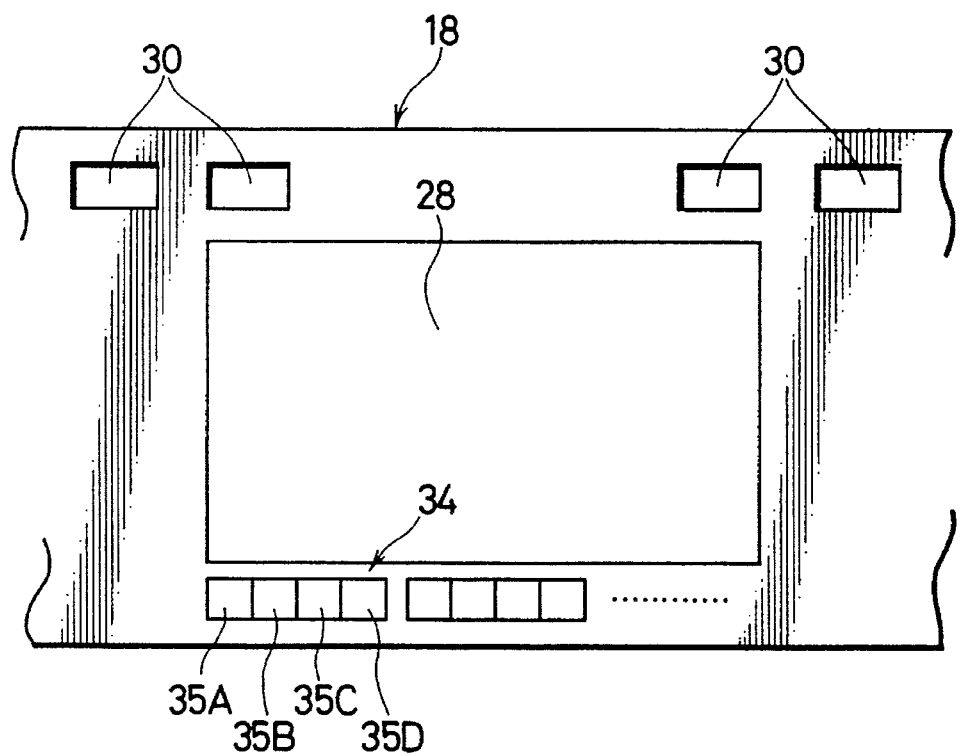
FIG. 7 is an enlarged front view of a part of the film.

As shown in FIG. 6, a plurality of frames, i.e., exposure areas, are arranged in the longitudinal direction of the film 18. At an upper edge of the film 18, perforations 30, i.e., through holes, are formed in positions corresponding to the opposite lateral ends of the respective frames 28. The feeding state of the film 18 is detected by detecting the presence of the perforations 30 by means of a photodetector 32 (FIG. 2).

At the lower edge of the film 18, strip-like magnetic recording portions 34 are provided in correspondence with the respective frames 28. When the film 18 is wound, data concerning photographing information, etc. are written in the magnetic recording portion 34 by a magnetic writing head 36 (see FIG. 2). The written data are read by a magnetic reading head 38 when the film 18 is rewound. As shown in FIG. 6, the data for the already exposed frames 28 are written in the magnetic recording portions 34, and no data is written in the magnetic recording portions for the unexposed frames 28. Thus, how much the film 18 is already exposed can be easily grasped by detecting whether or not any data is recorded in the magnetic recording portions 34 during the winding of the film 18.

In this embodiment, the data in TABLE-1 are generated in connection with their related parts of the camera 10, and written in the magnetic recording portions 34. In recording one kind of data, the following signals are written one after another in the magnetic recording portion 34: a start signal 35A indicating the start of the data, an ID signal 35B indicating the kind of the data, i.e., which of the data in TABLE-1 the presently written data is, a data signal 35C indicating contents of the data, and an end signal 35D indicating the end of the data.

TABLE 1

| | |
|---|---|
| AA | PRINT SIZE |
| BB | TOP/BOTTOM INFORMATION |
| CC | DATE |
| DD | OBJECT BRIGHTNESS |
| EE | FLASH INFORMATION |
| FF | OBJECT DISTANCE |
| GG | FOCAL LENGTH |
| HH | F-NUMBER |
| II | APERTURE VALUE |
| JJ | SHUTTER SPEED |
| KK | ISO VALUE |
| LL | EXPOSURE CORRECTION VALUE |
| MM | ARBITRARY USER INFORMATION (COMMENT, TITLE, ETC.) |

Figure 1:
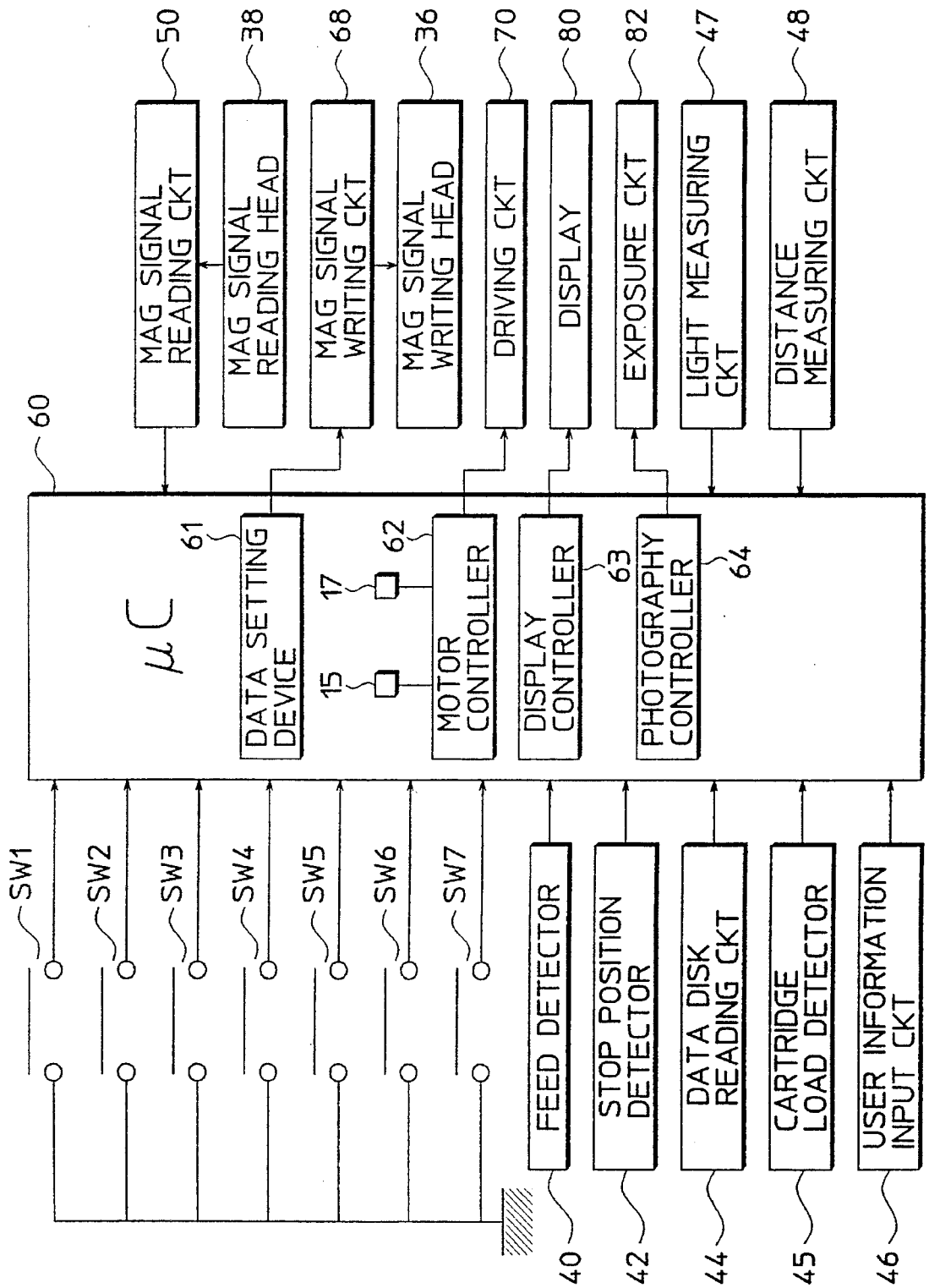
FIG. 1 is a block diagram showing a control system of a camera according to the present invention.

As shown in FIG. 1, the camera 10 is provided with a photography preparation switch SW1, a release switch SW2, a multiple exposure number setting switch SW3, a multiple exposure mode setting switch SW4, a silent film drive mode setting switch SW5, a high-speed film drive mode setting switch SW6, a rewind switch SW7, a film feed detector 40, a stop position detector 42 for detecting a position where the rewinding of the film was stopped, data disk reading circuit 44, a cartridge load detector 45, a user information input circuit 46 serving as a data designating means, a light measuring circuit 47, a distance measuring circuit 48, and a magnetic signal reading circuit 50. Output signals from these switches and circuits are input to a microcomputer 60.

The photography preparation switch SW1 is turned on when an unillustrated release button is pressed halfway. When the switch SW1 is turned on, a command signal for the light measurement and the distance measurement is sent to the microcomputer 60. The release switch SW2 is turned on when the release button is fully pressed. When the switch SW2 is turned on, an exposure command signal is sent to the microcomputer 60.

The number of times the multiple exposure number setting switch SW3 is pressed is counted in the microcomputer 60, and the counted number is set as a multiple exposure number. The multiple exposure mode setting switch SW4 is operated to switch an exposure mode between a normal exposure sure mode where the film is wound each time one exposure is formed for one frame 28 and a multiple exposure mode where the film is wound after the exposure is performed for one frame 28 by the number of times set by the setting switch SW3.

The silent film drive mode setting switch SW5 and the high-speed film drive mode setting switch SW6 are operated to switch the film drive mode. When the switches SW5 and SW6 are both off, the film drive mode is switched to a normal film drive mode. When the switch SW5 is on, the film drive mode is switched to a silent film drive mode where the film is fed at a low speed by, e.g., PWM-controlling the motor 13 shown in FIG. 10. When the switch SW6 is on, the film drive mode is switched to a high-speed film drive mode where the film is fed at a high speed using an external auxiliary power source 74 shown in FIG. 10.

The film feed detector 40 detects how much the film 18 is being fed in accordance with a detection signal from the photodetector 32. The stop position detector 42 includes an encoder which is mounted on the rotatory fork to which the lower end 17 of the sleeve 16 is attached. The detector 42 detects a rotational stop position of the sleeve 16 when the film 18 is completely rewound so as to conform this stop position to a predetermined angular position. The data disk reading circuit 44 judges in which rotation positions shown in FIGS. 4A to 4C the sleeve 16 of the film cartridge 14 stops in accordance with the detection signals from the respective photodetectors provided in the positions P1 and P2, and reads the information represented by the bar-code of the disk 20 secured on the sleeve 16, i.e., the film information.

The cartridge load detector 45 includes, for example, a reflection type photodetector provided in the vicinity of the place where the film cartridge 14 is to be loaded, and detects whether or not the film cartridge 14 is loaded.

The user information input circuit 46 is adapted to input data selected by the user as magnetic write data from the data CC to LL in TABLE-1 or an arbitrary information MM (comment, title, etc.).

Figure 8:
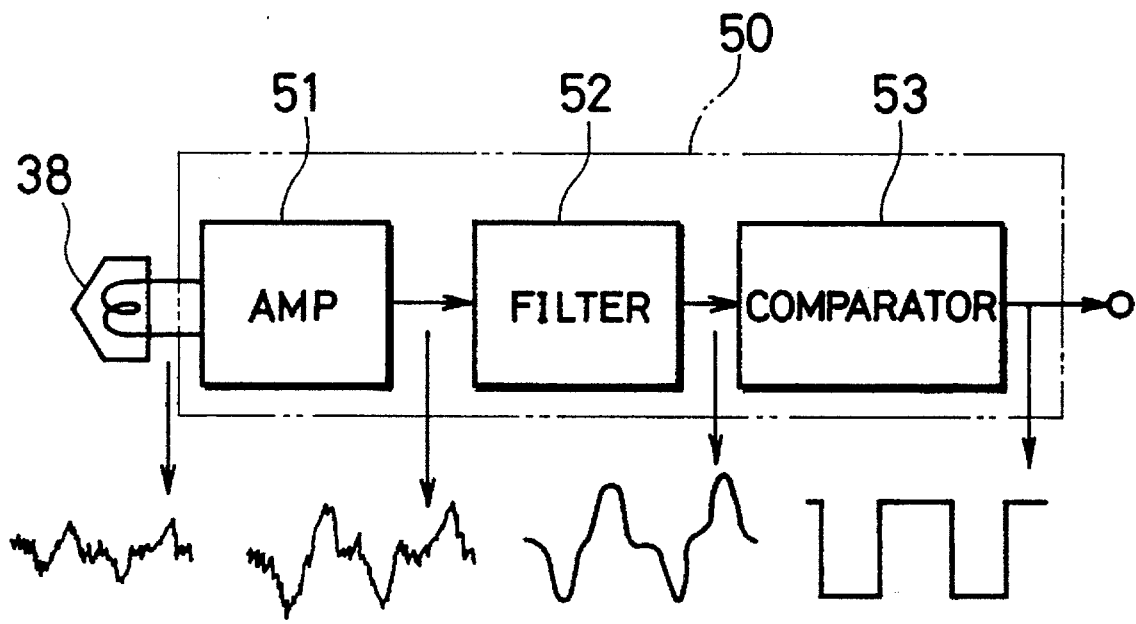
FIG. 8 is a block diagram of a magnetic signal reading circuit provided in the camera.

The magnetic signal reading circuit 50 is connected with the magnetic signal reading head 38 and includes an amplifier 51, a filter 52, and a comparator 53 as shown in FIG. 8. The signals recorded in the magnetic recording portions 34 are read in the form of a fine voltage by the reading head 38, and are amplified to a suitable level by the amplifier 51. Then, after having their noises removed by the filter 52, these signals are converted into logic level signals in the form of a digital signal by the comparator 53.

Figure 9:
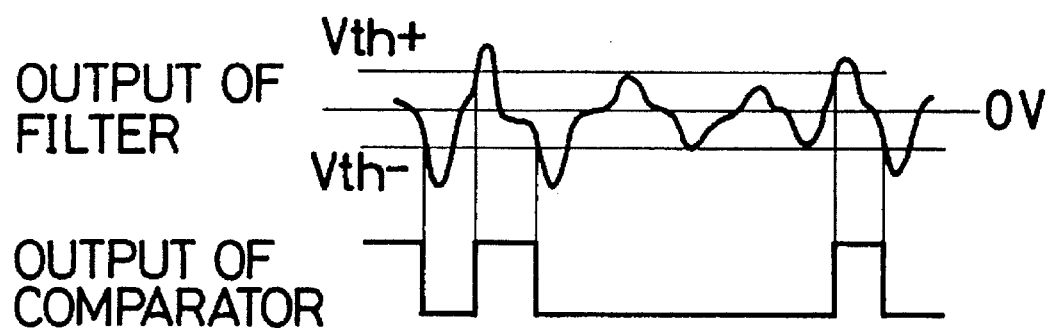
FIG. 9 is a diagram showing a signal processing of a comparator provided in the magnetic signal reading circuit.

Generally, it is difficult to read a magnetic signal with a sufficient level in a camera because of an azimuth angle between the film 18 and the head 38, a displacement of the film 18 in its widthwise direction, a variation in the film feeding speed, and jitters. However, it is possible to judge whether or not data is recorded by detecting the magnitude of the reproduced output. More specifically, if an analog signal is converted into a digital signal in accordance with a threshold level Vth in the comparator 53 as shown in FIG. 9, when no magnetic signal is recorded, the output of the comparator 53 does not change since the noise components barely exceed the threshold level. Conversely, when the data is recorded, the analog signal crosses the upper and/or lower threshold levels a number of times corresponding to the bit number of the data and the output of the comparator 53 repeatedly inverts for each bit as shown in FIG. 9. Accordingly, it can be judged that the data is normally recorded in the magnetic recording portion 34 if the number of inversions for one frame is a specified value or greater.

The microcomputer 60 is provided with a data setting device 61, a motor controller 62, a display controller 63, and a photography controller 64.

The data setting device 61 sets magnetic write data to be magnetically written in the magnetic recording portion 34 by means of a magnetic signal writing device including a magnetic signal writing circuit 68 and the magnetic signal writing head 36. Contents to be set are described in detail with reference to flowcharts shown in FIGS. 11 to 17.

Figure 10:
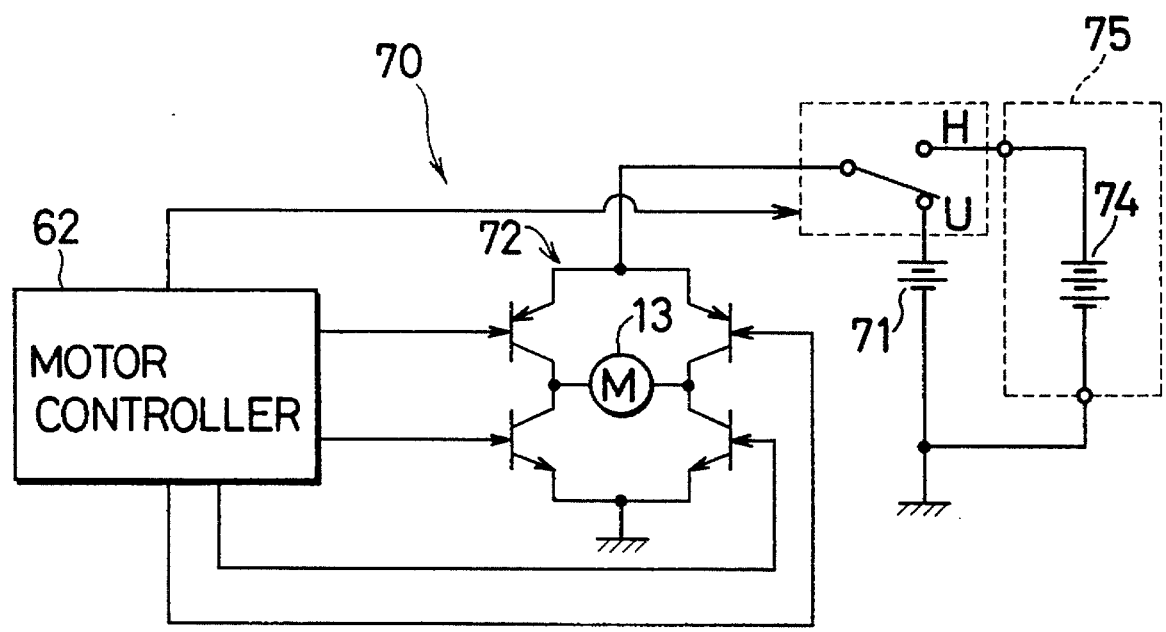
FIG. 10 is a diagram showing a feed motor driving circuit provided in the camera.

The motor controller 62 controls a feed motor driving circuit 70 as shown in FIG. 10. The driving circuit 70 is provided with an internal power source 71 and a motor driver 72 including four switching transistors. By simultaneously applying an on-voltage from the motor controller 62 to a pair of transistors of the motor driver 72 disposed in diagonal positions, a drive current for driving the motor 13 in the forward direction is supplied via these transistors to the motor 13. By simultaneously applying the voltage to another pair of transistors, a drive current for driving the motor 13 in the reverse direction is supplied via these transistors to the motor 13.

The motor controller 62 determines based on whether the film is wound or rewound which pair of transistors are to be turned on. Also, the motor controller 62 receives detection signals from the photodetectors 15 and 17 to control the driving of the motor 13 so that the pointer 22 points to a designated mark indicating the exposed, unexposed, or partial exposed state as described later.

A power source cartridge 75 carrying an external auxiliary power source 74 is detachably mountable on the camera 10. The external auxiliary power source 74 has a higher voltage than the internal power source 71. The high-speed film drive mode switch SW6 is held off while the power source cartridge 75 is not mounted. The switch SW6 is switched on when the power source cartridge 75 is mounted. When the switch SW6 is off, the internal power source 71 is connected with the motor driver 72 as shown in FIG. 10, thereby driving the feed motor 13 at a normal speed. When the switch SW6 is on, the external auxiliary power source 74 is connected with the motor driver 72, thereby driving the feed motor 13 at a speed higher than the normal speed. The motor controller 62 controls the feed motor 13 to drive at a low speed by means of a duty control such as a PWM-control when the switch SW5 is turned on.

The motor controller 62 forcibly rewinds the film when the rewind switch SW7 is turned on, even if the film 18 is partially exposed. Based on the state of the film, the motor controller 62 controls the film rewind stop position in accordance with the detection signal from the stop position detector 42. Specifically, when the film 18 is already exposed, i.e., all the frames 28 being already exposed, the sleeve 16 is stopped in such a rotational position where the black section of the bar-code of the disk 20 is detected in both of the positions P1 and P2, i.e., a rotational position where the pointer 22 points to the exposure mark 26 as shown in FIG. 5C as shown in FIG. 4C. When the film 18 is partially exposed, i.e., the film 18 being forcibly rewound in a state where only a part of the frames 28 were exposed, the sleeve 16 is stopped in such a rotational position where the white and black sections of the bar-code of the disk 20 are detected in the respective positions P1 and P2, i.e., a rotational position where the pointer 22 points to the partial exposure mark 25 as shown in FIG. 5B, as shown in FIG. 4B. When the film cartridge 14 is not yet used, the sleeve 16 is set in such a rotational position where the white section of the bar-code of the disk 20 is detected in both of the positions P1 and P2, i.e., a rotational position where the pointer 22 points to the non-exposure mark 24 as shown in FIG. 5A, as shown in FIG. 4A.

Accordingly, the state of the film in the film cartridge 14 can be grasped by detecting in which rotational position the disk 20 is located when the film cartridge 14 is loaded. The user can grasp the state of the film 18 only by seeing the mark pointed by the pointer 22. In other words, the motor controller 62 acts also as a state display control means for causing the disk 20 as a film state indicating means to indicate the film state.

The display controller 63 makes a variety of displays in a display 80 provided on the front surface of the camera 10. The photography controller 64 causes an exposure circuit 82 to perform a suitable exposure using measurement signals from the light measuring circuit 47 and the distance measuring circuit 48 in accordance with the set mode.

The control executed in the camera 10 is described with reference to flowcharts shown in FIGS. 11 to 17.

Figure 11:
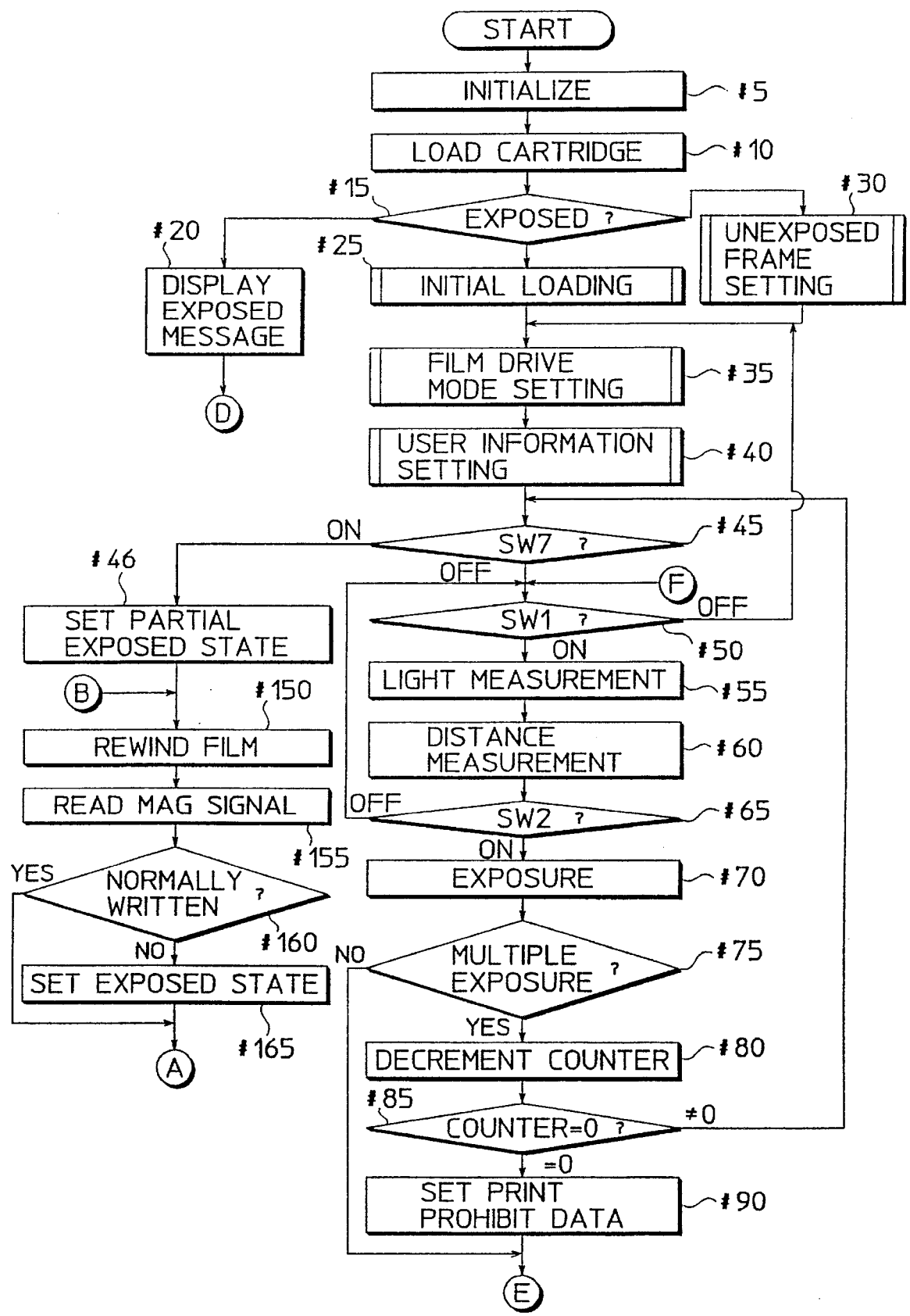
FIGS. 11 to 13 are flowcharts showing a main control routine of the camera.

Step #5 in FIG. 11: After being reset and started, the microcomputer 60 initializes its I/O ports and memories. At this stage, the film drive mode is set to the normal film drive mode, and data AA to GG in TABLE-1 are set as magnetic write data.

Step #10: The film cartridge 14 is loaded in the camera 10.

Step #15: The rotational position of the disk 20 in the loaded film cartridge 14 is detected, and the film state is judged based on the detection result. More specifically, in the case where the black section of the bar-code of the disk 20 is detected in both of the positions P1 and P2 as shown in FIG. 4C, this routine proceeds to Step #20 upon the judgment that the film 18 is already exposed. In the case where the white section of the bar-code of the disk 20 are detected in both of the positions P1 and P2 as shown in FIG. 4A, this routine proceeds to Step #25 upon the judgment that the film 18 is not yet exposed. In the case where the white and black sections of the bar-code of the disk 20 are detected in the respective positions P1 and P2 as shown in FIG. 4B, this routine proceeds to Step #30 upon the judgment that the film 18 is partially exposed.

Step #20: Since all the frames 28 of the film 18 in the loaded film cartridge 14 are already exposed, a warning message indicating that the film is already exposed is displayed in the display 80, and this routine proceeds to Step #205 (cartridge unloading, FIG. 13).

Figure 14:
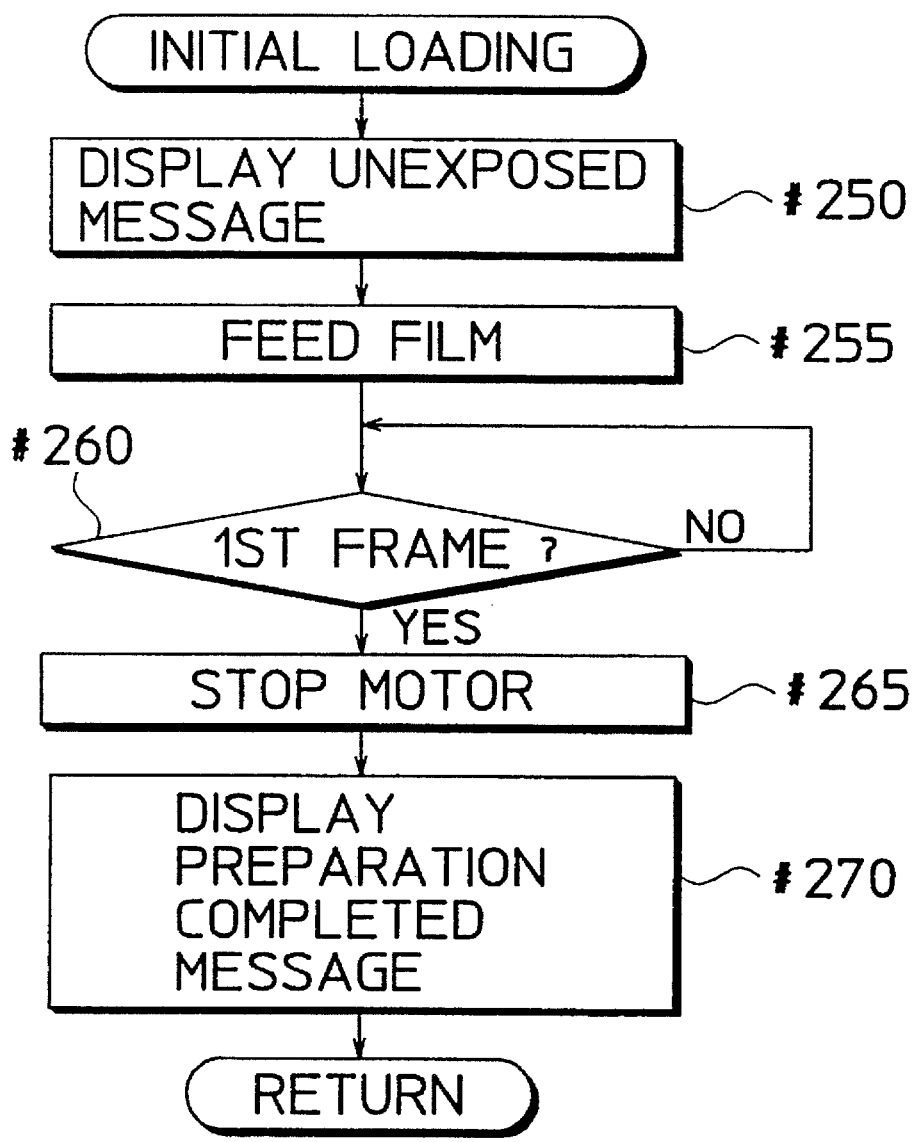
FIG. 14 is a flowchart showing a subroutine "Film Initial Loading"

Step #25: Since the film 18 in the loaded film cartridge 14 is not yet exposed, a normal initial loading (initialization) is performed to feed the film 18 so that the first frame is located at the photographing position. The initial loading is performed as shown in FIG. 14. After displaying a message in the display 80 that the film 18 is unexposed (Step #250), the feed motor 13 is driven in the forward direction to feed the film 18 from the film cartridge 14 (Step #255). When the photographing position of the first frame is detected by the film feed detector 40 (Step #260), the feed motor 13 is stopped (Step #265) and a message indicative of the completion of the photography preparation is displayed in the display 80 (Step #270).

Figure 15:
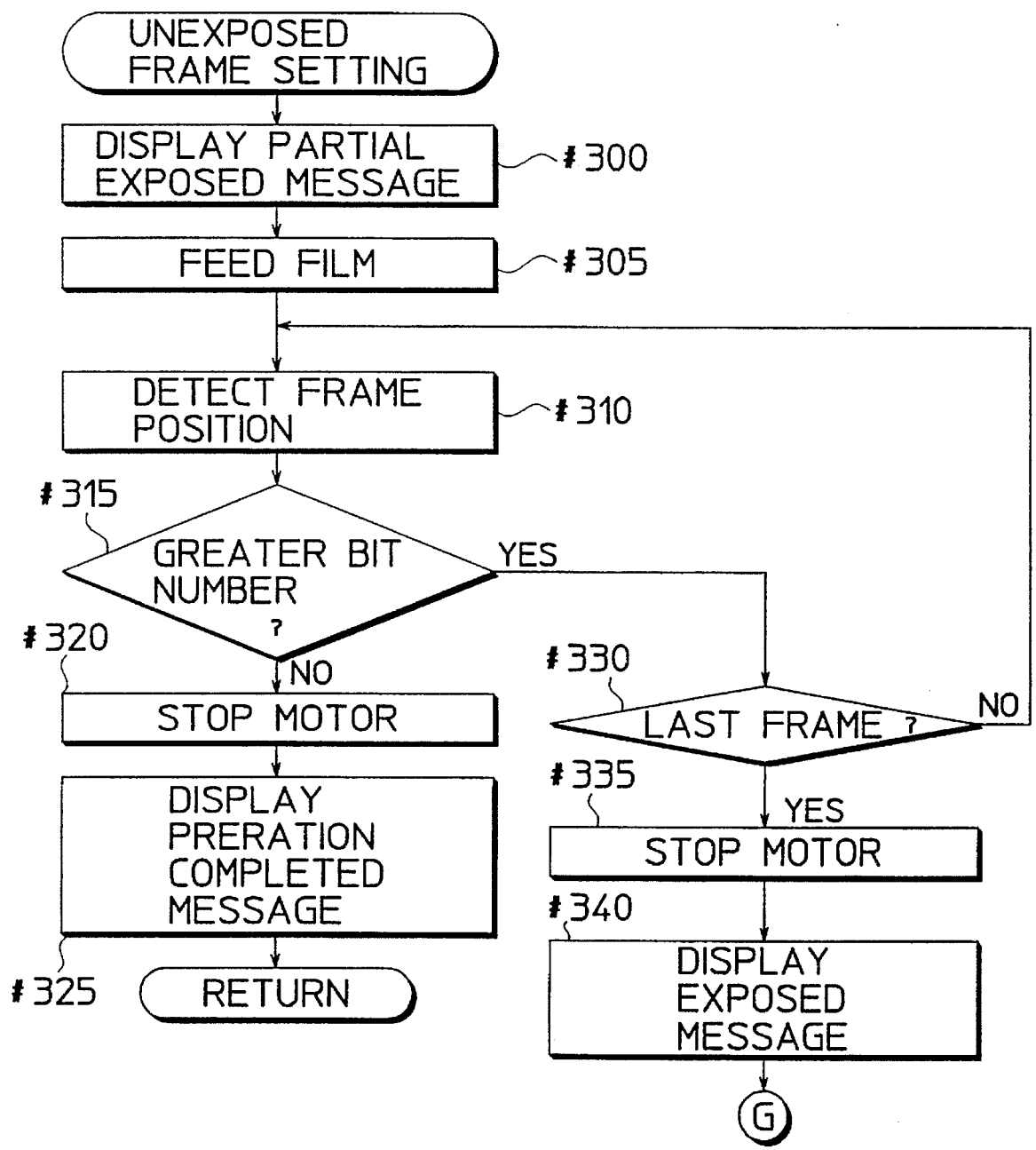
FIG. 15 is a flowchart showing a subroutine "Unexposed Frame Setting"
Figure 16:
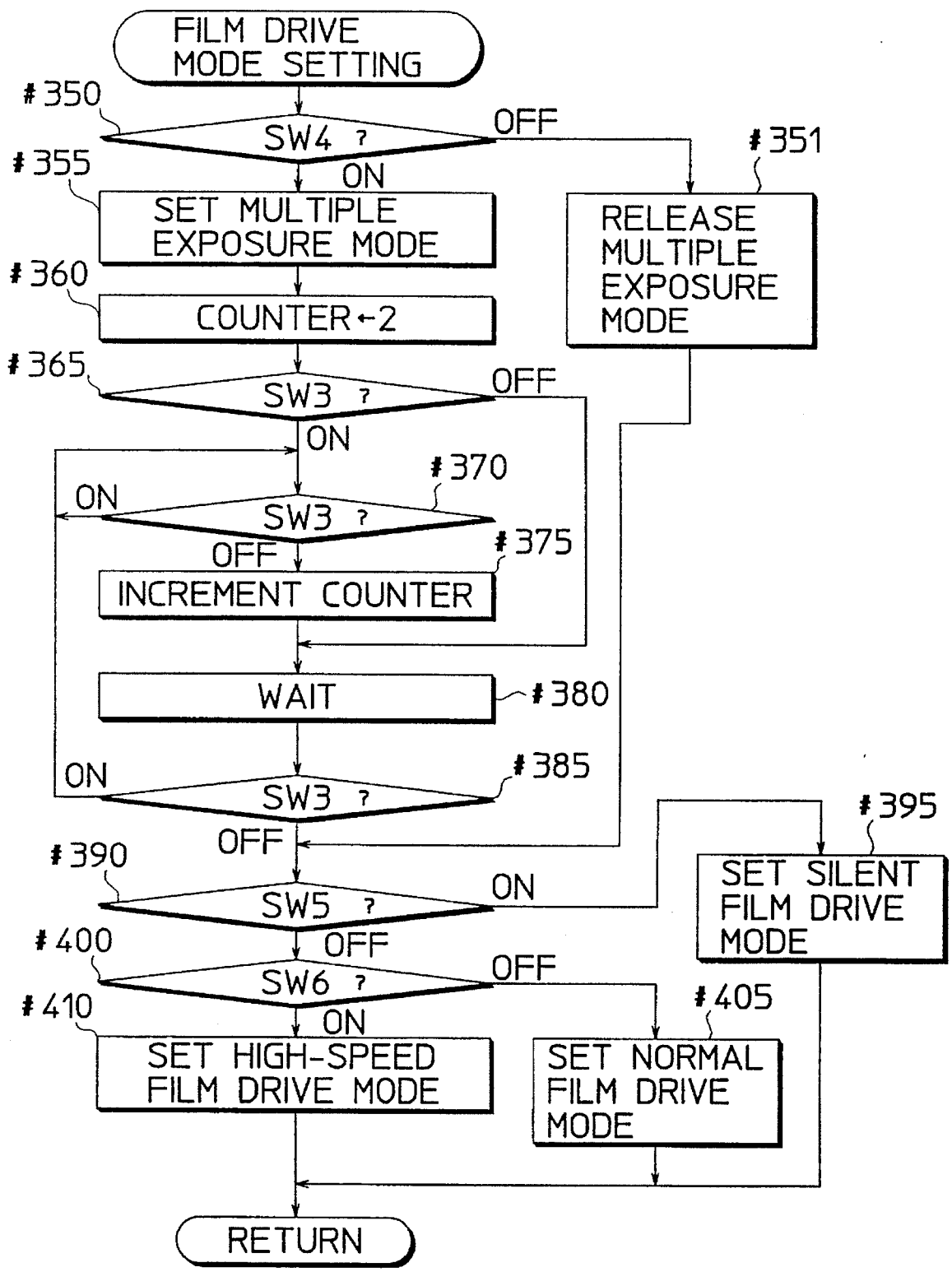
FIG. 16 is a flowchart showing a subroutine "Rewind Mode Setting"
Figure 17:
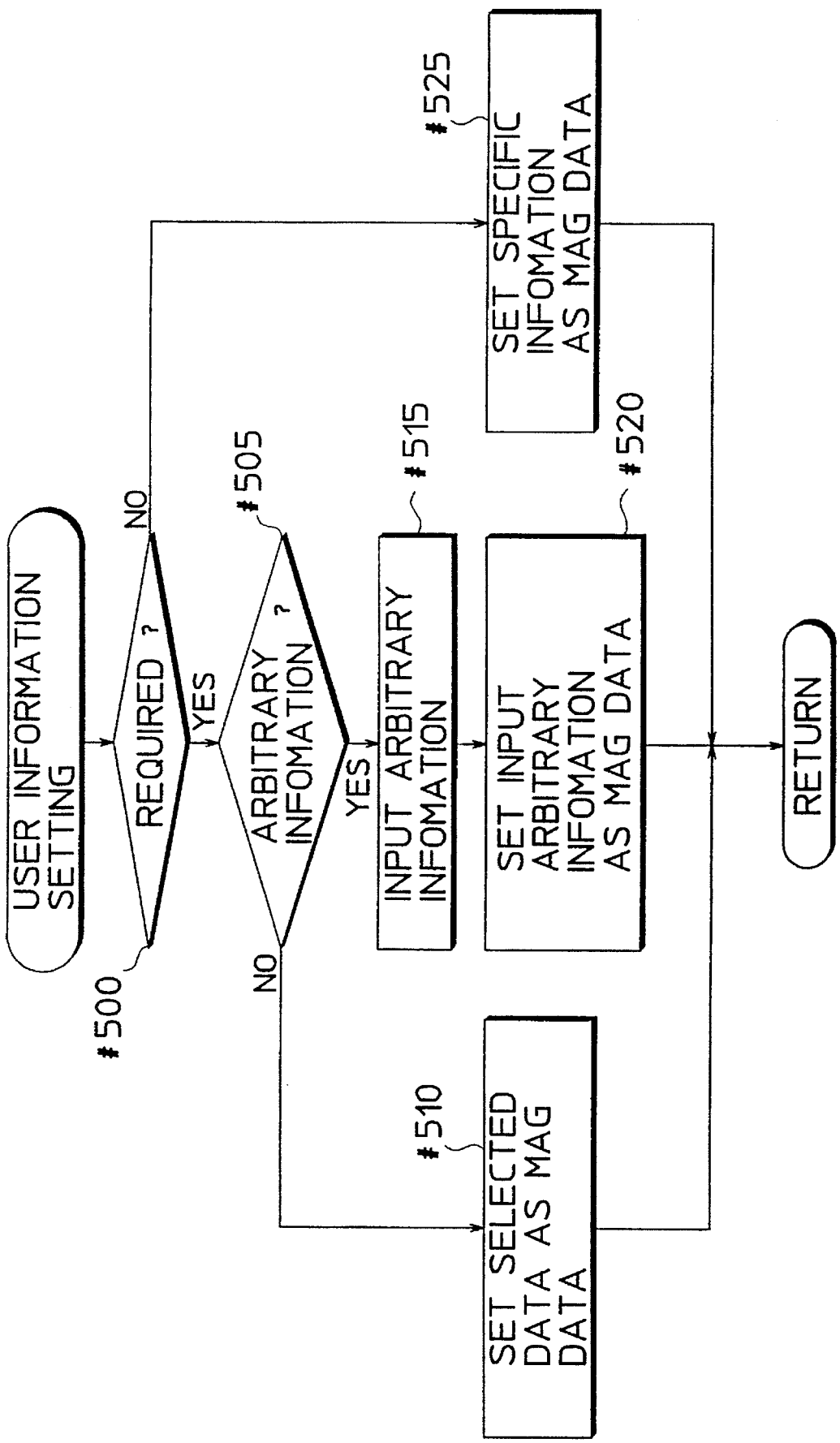
FIG. 17 is a flowchart showing a subroutine "User Information Setting"

Step #30: Since the film 18 in the loaded film cartridge 14 is partially exposed, the film 18 is fed while jumping the already exposed frame(s) so that the first unexposed frame can be set in the photographing position. The first unexposed frame is set in the procedure as shown in FIG. 15. After displaying a message indicating that the film 18 is partially exposed (Step #300), the feed motor 13 is driven in the forward direction to feed the film 18 from the film cartridge 14 (Step #305). While detecting the positions of the respective frames 28 by the film feed detector 40 during the feed of the film 18, the inversion of the digital signal output from the magnetic signal reading circuit 50, i.e., bit number of the data, is counted (Step #310). It is judged for each frame 28 whether the bit number is greater than the specified value. Upon finding a frame having a bit number smaller than the specified value, i.e., an unexposed frame corresponding to the magnetic recording portion 34 in which no data is written (NO in Step #315), the feed motor 13 is stopped (Step #320) and a message indicative of the completion of the photography preparation is displayed (Step #325). If the film 18 is fed to the last frame (YES in Step #330) without finding any unexposed frame (YES in Step #315), it means that the film 18 has no unexposed frame. Accordingly, the feed motor 13 is stopped (Step #335), the message indicating that the film 18 is already exposed is displayed (Step #340), and this routine proceeds to Step #195 in FIG. 12 to rewind the film 18.

Step #35: In this state, the film drive mode is set in the procedure as shown in a flowchart of FIG. 16.

If the multiple exposure mode setting switch SW4 is on (ON in Step #350), the exposure mode is set to the multiple exposure mode (Step #355). In this mode, first, an initial value "2" is set in an exposure counter (Step #360), and the multiple exposure number is set at the number of times the multiple exposure number setting switch SW3 is turned on. More specifically, the count value of the exposure counter is incremented by one (in Step #375) when the switch SW3 is turned off (OFF in Step #370) after being turned on (YES in Step #365). Thereafter, upon lapse of a predetermined time (Step #380), the state of the switch SW3 is detected (Step #385). This routine returns to Step #370 if the switch SW3 is on in Step #385.

If the switch SW4 is off (OFF in Step #350), on the other hand, the exposure mode is not set to the multiple exposure mode or the multiple exposure mode is released (Step #351).

If the switch SW3 is off in Step #385, the states of the switches SW5 and SW6 are detected upon the judgment that the exposure number setting was completed. Specifically, when the silent film drive mode setting switch SW5 is on (ON in Step #390), the silent film drive mode is set as a film drive mode (Step #395). If the switch SW5 is off (OFF in Step #390) and the high-speed film drive mode setting switch SW6 is on (ON in Step #400), the high-speed film drive mode is set (Step #410). If neither the switch SW5 nor SW6 is off, the normal film drive mode is set (Step #405).

Although not shown in the flowcharts, when any of the multiple exposure mode, the high-speed film drive mode, and the silent film drive mode is set, a warning message is displayed in the display 80 since the data are not normally written in the magnetic recording portion 34.

Step #40: In this step, the user information is set in the procedure as shown in a flowchart of FIG. 17. If there is an information setting requirement (YES in Step #500), it is judged whether the required information is an arbitrary information (information arbitrarily set by the user) (Step #505). If the required information is not the arbitrary information, the data AA and BB and the data selected by the user from the data CC to LL in TABLE-1 by the way of the user information input circuit 46 are set as magnetic write data (Step #510). If the required information is the arbitrary information, the user inputs comment or like information as an arbitrary information by the way of the user information input circuit 46 (Step #515). The input arbitrary information and the data AA and BB are set as magnetic write data (Step #520). If there is no information setting requirement in Step #500, the data AA to GG set in advance as specific information are set as magnetic write data (Step #525).

Since the data AA (print size) and BB (top/bottom information) out of the data in TABLE-1 are information necessary to make prints at the photolaboratory, these data are written in any of Steps #510, #520 and #525.

Step #45: The state of the rewind switch SW7 is judged. If the switch SW7 is on (i.e., if there is a rewind requirement), the state of the film 18 is set to the partial exposed state (Step #46) and the film 18 is rewound (Step #150). If the switch SW7 is off, this routine proceeds to Step #50.

Step #50: The state of the photography preparation switch SW1 is judged. If the switch SW1 is on, the light measurement and the distance measurement are performed (Steps #55 and #60). Then, the state of the release switch SW2 is detected (Step #65). If the release switch SW2 is off, the routine returns to Step #50. If the switch SW2 is on, the exposure is performed (Step #70).

Step #75: After the completion of the exposure, the exposure mode is judged. In the case of the multiple exposure mode, the count value of the exposure counter is decremented by one (Step #80). The operations in Step #45 and subsequent steps are repeated until the count value of the exposure counter becomes zero (≠0 in Step #85). When the count value of the exposure counter becomes zero, print prohibit data is set as magnetic write data instead of the data CC to LL in TABLE-1 (Step #90). This print prohibit data is used to prohibit the printing of the data when the photographed image is printed in a print sheet. Upon reading this data during the development at the photolaboratory, the printing concerning this data is prohibited. No print prohibit data is set for the arbitrary information MM regardless of whether or not the multiple exposure mode is set. Thus, the arbitrary information MM is printed as it is.

Figure 12:
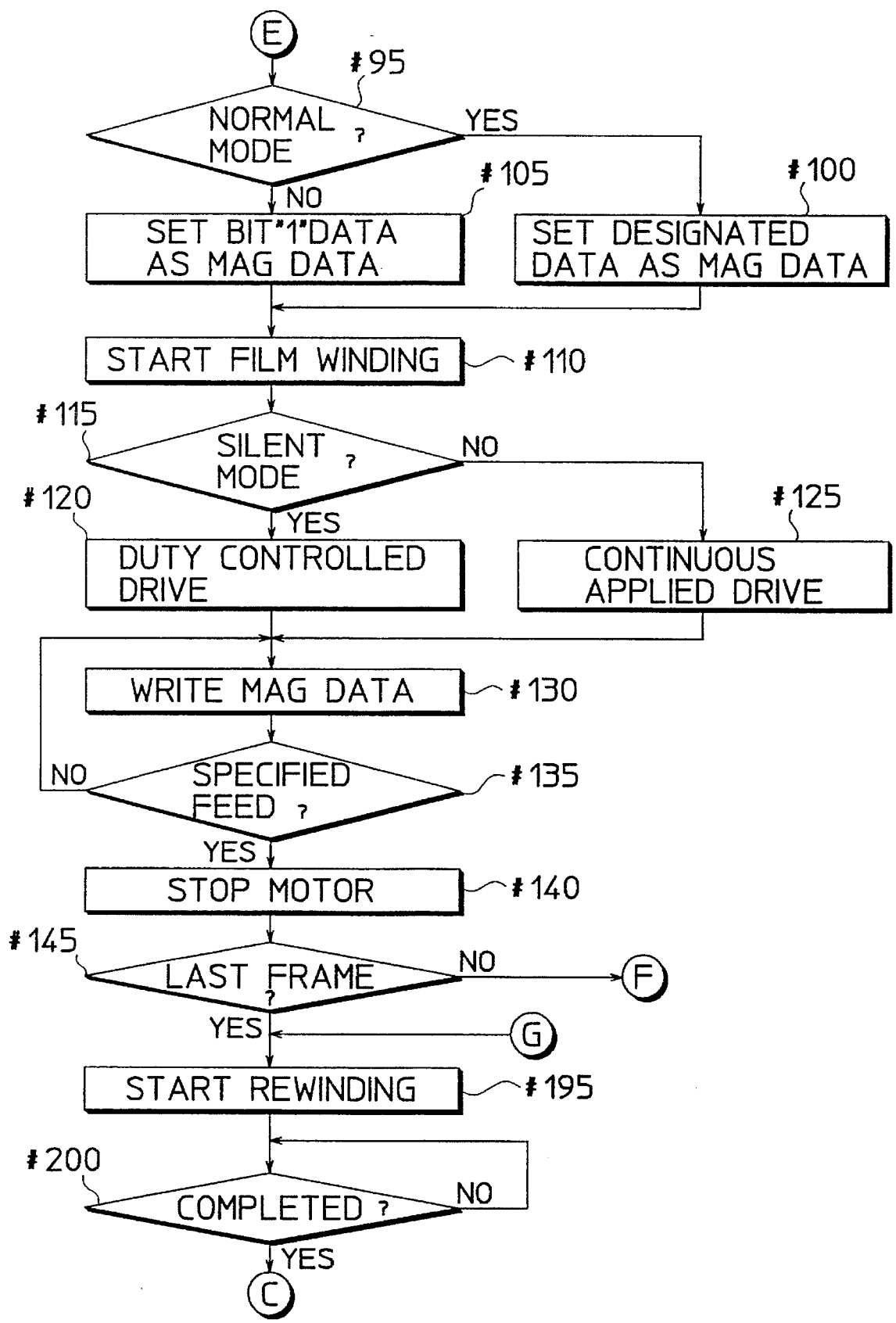

Step #95 in FIG. 12: After the completion of the exposure, the film drive mode is judged. In the case of the normal film drive mode (YES in Step #95), the designated data are set as magnetic write data (Step #100). In the case of special mode (silent film drive mode or high-speed film drive mode) (NO in Step #95), data consisting only of bits "1" (all bits may be "0") is set as the magnetic write data (Step #105). Such meaningless data is input for the following reason. In the case of the high-speed film drive mode, the reliability of the written data cannot be guaranteed because of a poor writing responsiveness resulting from the very high speed. Further, in the case of the silent film drive mode, since the speed variation and the jitters are likely to become large because of the low speed film driving by means of PWM or the like, the data are written with poor reliability. The data is input to prevent the erroneous processing using the data having the low reliability. By not stopping the writing of the data, but writing the meaningless data in the magnetic recording portion 34, it can be judged during the rewinding of the film that the corresponding frame 28 is already exposed.

Steps #110 to #145: The winding control is performed in these steps. After the start of the winding (Step #110), a duty control (PWM control, etc.) is executed to drive the feed motor 13 at a low speed (Step #120) when the silent film drive mode is set (YES in Step #115). When the other film drive mode is set (NO in Step #115), power is continuously applied to the feed motor 13 to drive it at a specified speed (Step #125). While controlling the above winding operation, the magnetic write data set in Step #100 or Step #105 are written in the magnetic recording portion 34 by the magnetic writing head 36 (Step #130). After the film 18 is fed by a specified amount, i.e., by one frame (YES in Step #135), the driving of the feed motor 13 is stopped (Step #140). When the last frame is reached (YES in Step #145), this routine proceeds to a rewinding sequence carried out in Step #195 and subsequent steps. Unless the last frame is reached (NO in Step #145), the operations in Step #50 and subsequent steps are repeated.

Rewinding: After reaching the last frame, the feed motor 13 is driven in the reverse direction to start the rewinding (Step #195). When the film 18 is completely rewound (Step #200), the feed motor 13 is stopped in the exposure position (an angular position shown in FIG. 4C) in accordance with the angular position (film rewind stop position) detected by the stop position detector 42 (Step #185 in FIG. 13). Thereafter, a message indicative of the completion of the rewinding is displayed (Step #190) and it is waited until the film cartridge 14 is unloaded (Step #205).

Figure 13:
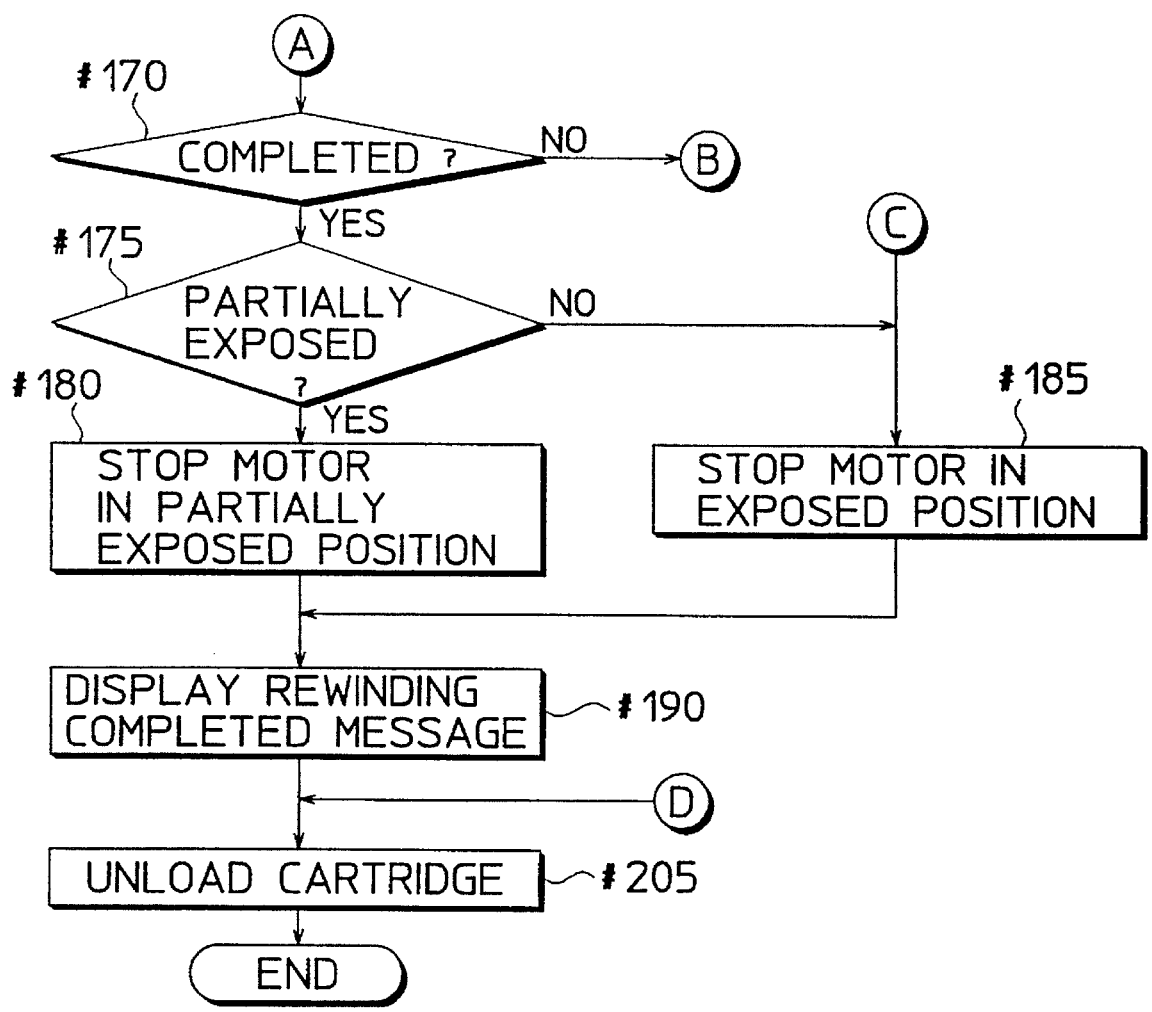

Steps #150 to #190 in FIGS. 11 and 13: In these steps, the intermediate rewinding is performed. After starting the rewinding by driving the feed motor 13 in the reverse direction (Step #150 in FIG. 11), the magnetic signals for the respective frames 28 are read similar to Step #310 (Step #155). If the data for all the frames 28 are normally written, i.e., the number of bits having an output of not lower than the specified level is not smaller than the specified value, for all the frames 28 (YES in Step #160), this routine directly proceeds to Step #170. If the data is not normally written in any of the frames 28, i.e., the number of bits having an output of not lower than the specified level is smaller than the specified value, for any of the frames 28 (NO in Step #160), the film state is set to the exposed state despite the ongoing rewinding (Step #165). This prevents the frame whose data is not normally written from being doubly exposed in the next use upon being detected to be an unexposed frame.

Thereafter, when the film 18 is completely rewound (YES in Step #170 in FIG. 13), the film state is detected (Step #175). If the detected film state is the partially exposed state (YES Step #175), the feed motor 13 is stopped in the partially exposure position shown in FIG. 4B in accordance with the detection signal from the stop position detector 42 (Step #180). If the detected film state is the exposed state (NO in Step #175), the feed motor 13 is stopped in the exposure position shown in FIG. 4C in accordance with the above detection signal (Step #185). Thereafter, the message indicating that the film 18 was completely rewound is displayed (Step #190), and it is waited until the film cartridge 14 is unloaded (Step #205).

As described above, in the camera 10, when no data is designated by the means of the user information input circuit 46, the predetermined specific information AA to GG are automatically set as magnetic rite data. Accordingly, the data suitably conforming to the user's desire can be set in accordance with the data designation when the user designates the data, and the specific information AA to GG are written even when no data is designated by the suer. Thus, the magnetic data recording function of the camera 10 can be fully utilized.

As another means for indicating the film state in the film cartridge 14, for example, it may be appreciated to provide a magnetic recording portion on the outer surface of the film cartridge 14 and write the film state in this magnetic recording portion.

Further, the means for preventing the erroneous double exposure is not limited to the one described in the foregoing embodiment. A control as shown in a flowchart of FIG. 18 is also capable of preventing the double exposure.

Figure 18:
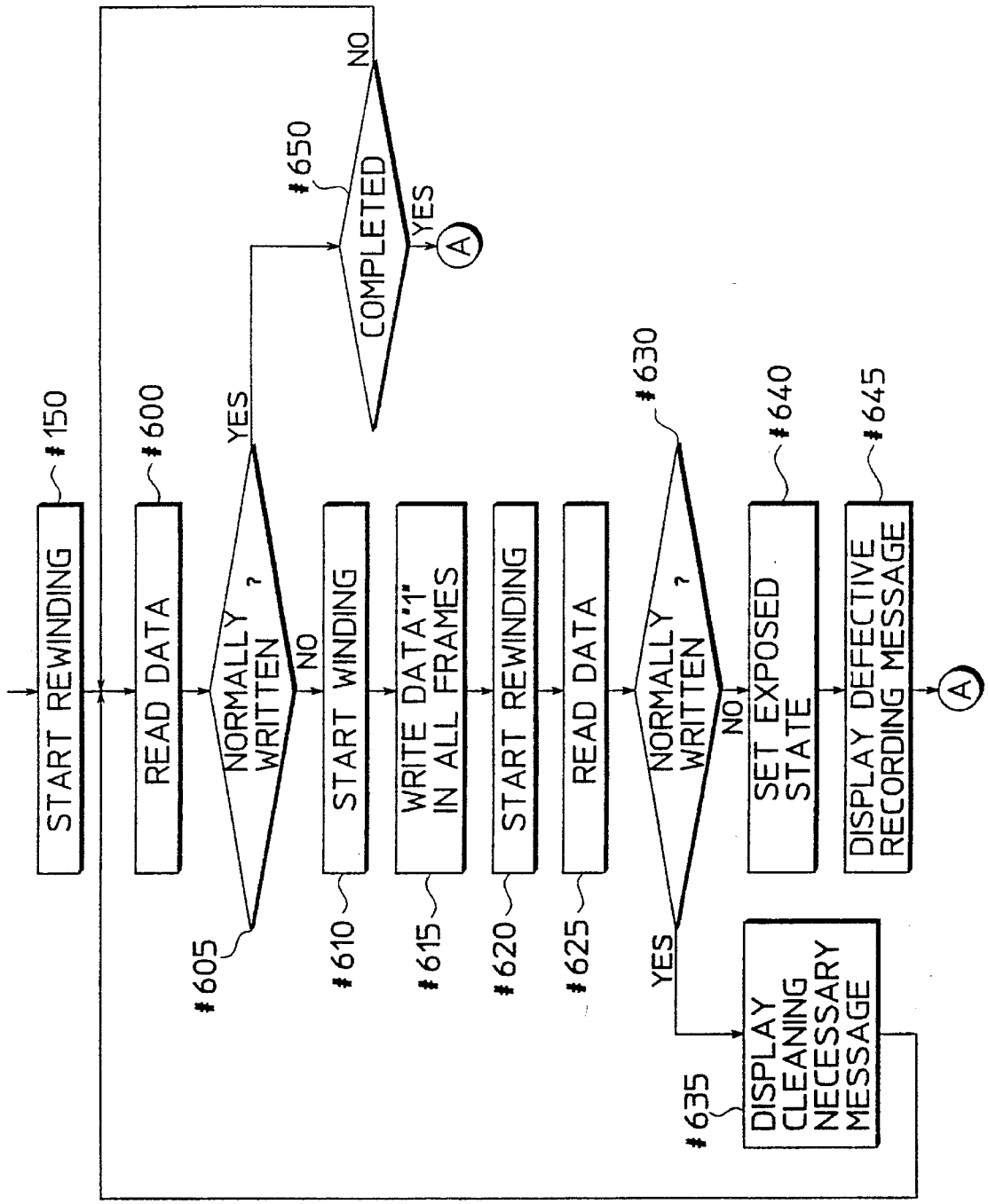
FIG. 18 is a flowchart showing another control carried out to prevent a double exposure.

FIG. 18 shows another operations in place of operations in Steps #150 to #165 shown in FIG. 11. After the start of the rewinding (Step #150), the data are read during the rewinding (Step #600), and it is judged whether the data are normally written in the magnetic recording portions 34 corresponding to the respective frames 28 (Step #605). If there is any frame 28 whose data is defectively written, i.e., the number of bits having an output of not lower than the specified level is smaller than the specified value, for any of the frames 28 (NO in Step #605), the rewinding is stopped and the winding is started to write the data "1" in the magnetic recording portions 34 corresponding to all such frames 28 (Step #615). This data is error detection prevention data and the content thereof does not particularly matter. Any data will do so long as it prevents the frames 28 from being erroneously detected to be an unexposed frame. Thereafter, the rewinding is restarted to read the data recorded in the magnetic recording portions 34 again (Steps #620 and #625). Upon judging that the data was normally written in Step #615 (YES in Step #630), a message indicating that a head cleaning is necessary is displayed in the display 80 by way of precaution (Step #635), and this routine returns to Step #600. If the data is judged to be not normally written despite the data writing operation in Step #615 (NO in Step #630), the film 18 is immediately completely rewound and the film state is set to the exposed state, assuming the possibility that the recording device is defective (Step #640). Finally, a warning message indicative of the defective recording device is displayed (Step #645).

If there is provided a data write control means for, when detecting a data write error during the rewinding, writing an error detection prevention data for the frame corresponding to the data write error, the double exposure can be prevented when the film cartridge 14 is reused even if the film state is not set to the exposed state, i.e., to the partially exposed state. Further, upon detecting the erroneous data writing while rereading the data, despite the fact that the error detection prevention data was written, the film state is forcibly set to the exposed state, thereby more securely preventing the double exposure.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:

a data generating device which generates a plurality of kinds of data;

a data designating device which designates a kind of data to be recorded among the generated plurality of kinds of data;

a record data setting device which sets the kind of data designated by the data designating device as record data when the data designating device designates it, and sets a predetermined kind of data as record data when the data designating device designates no kind of data; and a recording device which records the set record data on a film mounted on the camera.

2. A camera as defined in claim 1, wherein the recording device includes a magnetic recorder for recording the set record data on the film magnetically.

3. A camera as defined in claim 2, further comprising a film feeding device which feeds the film, wherein the magnetic recorder executes the recording when the film is being fed.

4. A camera as defined in claim 3, wherein the film feeding device has a first feeding mode for feeding the film at a normal speed and a second feeding mode for feeding the film at a speed other than the normal speed, the camera further comprising:

a controller which controls the magnetic recorder to record the set record data on the film only when the film is fed in the first feeding mode.

5. A camera as defined in claim 4, wherein:

the data generating device generates data relating to photographing and data not relating to photographing; and the controller controls the data designating device and the magnetic recorder to forcibly designate and record data not relating to photographing when the film is fed in the second feeding mode.

6. A camera as defined in claim 1, wherein the plurality of kinds of data includes common data which is to be designated at all times and is to be included in the predetermined kind of data.

7. A camera as defined in claim 6, wherein the common data is data necessary for printing a photograph.

8. A camera as defined in claim 1, wherein the plurality of kinds of data includes data which can be arbitrarily made by the user.

9. A camera comprising:

a first data generating device which generates a kind of primary data;

a second data generating device which generates a plurality of kinds of additional data different from the primary data;

a data designating device which designates a kind of additional data to be recorded among the plurality of kinds of additional data;

a record data setting device which sets record data including the primary data and the additional kind of data designated by the data designating device when the data designating device designates it, and sets record data including the primary data and a predetermined additional kind of data when the data designating device designates no kind of additional data; and a recording device which records the set record data on a film mounted on the camera.

10. A camera as defined in claim 9, wherein the recording device includes a magnetic recorder for recording the set record data on the film magnetically.

11. A camera as defined in claim 10, further comprising a film feeding device which feeds the film, wherein the magnetic recorder executes the recording when the film is being fed.

12. A camera as defined in claim 11, wherein the film feeding device has a first feeding mode of for feeding the film at a normal speed and a second feeding mode of for feeding the film at a speed other than the normal speed, the camera further comprising:

a controller which controls the magnetic recorder to record the set record data on thee film only when the film is fed in the first feeding mode.

13. A camera as defined in claim 12, wherein:

the second data generating device generates data relating to photographing and data not relating to photographing; and the controller controls the data designating device and the magnetic recorder to forcibly designate and record data not relating to photographing when the film is fed in the second feeding mode.

* * * * *